(12) United States Patent
Kanou

(10) Patent No.: US 7,798,512 B2
(45) Date of Patent: Sep. 21, 2010

(54) BICYCLE

(75) Inventor: Kinya Kanou, Osaka (JP)

(73) Assignee: Land Walker, Ltd., Kumamoto (JP)

( * ) Notice: Subject to any disclaimer, the term of this patent is extended or adjusted under 35 U.S.C. 154(b) by 0 days.

(21) Appl. No.: 12/084,109

(22) PCT Filed: Oct. 27, 2006

(86) PCT No.: PCT/JP2006/321520

§ 371 (c)(1),
(2), (4) Date: Jun. 26, 2008

(87) PCT Pub. No.: WO2007/049753

PCT Pub. Date: May 3, 2007

(65) Prior Publication Data

US 2008/0258426 A1    Oct. 23, 2008

(30) Foreign Application Priority Data

Oct. 18, 2003   (JP) ............................. 2006-284228
Oct. 28, 2005   (JP) ............................. 2003-314978

(51) Int. Cl.
*B62H 7/00* (2006.01)
(52) U.S. Cl. .................................................... 280/293
(58) Field of Classification Search ................. 180/209;
280/293, 295, 296, 297
See application file for complete search history.

(56) References Cited

U.S. PATENT DOCUMENTS 1,403,249 A * 1/1922 Johanknetch ............... 280/295
RE18,424 E * 4/1932 Hess ........................... 280/293
3,465,840 A * 9/1969 Summers ..................... 180/209
3,700,059 A * 10/1972 Sutton ......................... 180/209
4,488,617 A * 12/1984 Jaulmes ....................... 180/209
4,826,194 A * 5/1989 Sakita ......................... 285/302
2005/0248140 A1  11/2005 Wagner

FOREIGN PATENT DOCUMENTS

| JP | 51-40192 A | 10/1976 |
| JP | 59-185183 U | 12/1984 |
| JP | 1-136883 A | 5/1989 |
| JP | 2-237878 A | 9/1990 |
| JP | 2000-168648 A | 6/2000 |
| JP | 2000-335468 A | 12/2000 |
| JP | 2001-315677 A | 11/2001 |
| JP | 3300925 B2 | 4/2002 |
| WO | WO-2004/014716 A1 | 2/2004 |

* cited by examiner

*Primary Examiner*—Lesley Morris
*Assistant Examiner*—Daniel Yeagley
(74) *Attorney, Agent, or Firm*—Birch, Stewart, Kolasch & Birch, LLP

(57) ABSTRACT

A bicycle comprising a longitudinally extending frame, a front wheel disposed at the front of the frame, a rear wheel disposed at the rear thereof, and first and second auxiliary supporting devices disposed on each side of the rear wheel, each of the auxiliary supporting devices including an arm that has one end pivoted to the frame and the other end vertically movable as a free end and that can rotate independently of each other, an auxiliary wheel for assisting traveling of the bicycle pivotally supported parallel with the rear wheel, a spring for energizing the arm in a rotating direction such that the auxiliary wheel moves downward, and a disc rotor which can be locked to restrict the rotation of the arm to thereby fix the vertical movement of the auxiliary wheel when stopping at a red light.

9 Claims, 14 Drawing Sheets

BICYCLE

TECHNICAL FIELD

The present invention relates to a bicycle that can stand upright when not moving so that an elderly rider can ride it safely and that also allows the rider to make a smooth turn by tilting the body of the bicycle in moving.

BACKGROUND OF THE INVENTION

To expand the demand for bicycles to the elderly whose numbers are steadily increasing, various bicycles have been developed that can be ridden safely and comfortably by the elderly who are losing their physical strength including leg strength, balance sense, and alertness.

Such bicycles include three-wheeled cycles that have two rear wheels arranged side by side to support the load by three wheels including a front wheel. A three-wheeled cycle can stand upright without the rider controlling balance when not moving, and it has excellent stability when proceeding straight. When turning right or left, on the other hand, the rider cannot tilt the body of the bicycle supported by the three wheels and is instead forced to steeply lean his/her upper body toward the inside of the curve so as to balance with the centrifugal force. This approach, however, is hard especially for the elderly, possibly causing them to be swung outward by the centrifugal force, thereby getting off balance and hence turning over.

To avoid such a consequence, three-wheeled cycles having independent suspension wheels have been suggested as shown in FIG. 13, (see, for example, Patent Document 1). In such a three-wheeled cycle, two rear wheels "a, a" are each provided with a suspension and move vertically independently of each other. The left rear wheel "a" is chain-driven to allow the rider to control the steering of a front wheel "b". The three-wheeled cycle allows the rider make a smooth turn by tilting the body of the cycle with the assistance of the individual suspensions.

The tilting of the body of the cycle, however, requires relatively soft suspensions. The soft suspensions work even when the cycle is not moving and may be felt as being wobbly by elderly riders who are losing their physical capabilities. Furthermore, the cushioning characteristics of the suspensions which work effectively when the bicycle is ridden on a rough road can be felt by elderly riders as unstable bouncing vibration.

When the rider steers to the right, the left rear wheel "a", which is the drive wheel supports the right turn, thus allowing the rider to perform smooth cornering. When the rider steers to the left, on the other hand, the front wheel touches the road surface on the right side of the line extended from the drive wheel. As a result, the front wheel causes a force to act to prevent the left turn, thus failing to allow the rider to perform smooth cornering. The problem of not allowing the rider to perform smooth cornering in both right and left directions could be solved by providing a two-wheel drive mechanism having a differential gear. However, this would require a complex mechanism, having trouble with maintenance and increasing the production cost.

On the other hand, as shown in FIG. 14, bicycles with auxiliary wheels have been suggested (see, for example, Patent Document 2). The bicycle of FIG. 14 includes a spring means and a locking means. The spring means includes a U-shaped frame "f" and right and left arms "e, e". The U-shaped frame "f" has a horizontal shaft "d" pivoted to a mainframe. The right and left arms "e, e" are bent backward from both ends of the horizontal shaft "d" and have auxiliary wheels "g" at their ends. The spring means presses the auxiliary wheels "g" downward, and the locking means prevents the rotation of the frame "f". In this bicycle with the auxiliary wheels, the front and rear wheels are used during normal riding, and when the bicycle is stopped or moving slowly, the locking means locks the vertical movement of the auxiliary wheels, thereby avoiding the bicycle from falling over.

Patent Document 1: Japanese Patent Unexamined Publication No.

Patent Document 2: Japanese Patent Unexamined Publication No.

DISCLOSURE OF THE INVENTION

Problems to be Solved by the Invention

In the bicycle with the auxiliary wheels, the right and left auxiliary wheels "g, g" are pivoted to the ends of the arms "e, e" of the U-shaped frame "f" and move integrally vertically by the rotation of the U-shaped frame "f" pivoted to the mainframe of the bicycle. Therefore, when the right and left auxiliary wheels are on an uneven road surface, such as when the road has a lateral slope or when one auxiliary wheel runs onto a stepped portion, the height of the auxiliary wheels is fixed with only the higher one touching the road surface. The problem is that if the body of the bicycle tilts to the other side in this state, the other auxiliary wheel touches the road surface at a certain inclination, but then falls over due to an inertia force.

Another problem of the bicycle with the auxiliary wheels is as follows. When the rider makes a turn by tilting the body of the bicycle, if the auxiliary wheel "g" on the inside of the curve goes up by being pressed by the road surface, the other auxiliary wheel "g" also goes up and increases the resistance. This fails to allow the rider to achieve smooth movement. Yet another problem is as follows. When one auxiliary wheel "g" is in a certain position, the other auxiliary wheel "g" moving vertically may touch the rider's leg and hence disturb the pedaling. This problem could be solved by using not the swing arm type, but a direct driven type in which the auxiliary wheels "g" are vertically slid along a vertical support shaft. The direct driven type, however, would make the structure complicated, increasing the bicycle weight.

The present invention basically includes a pair of arms rotatable independently of each other and a pair of arm lock means for restricting the rotation of the arms, thereby locking the vertical movement of the auxiliary wheels. The present invention has an object of providing a bicycle that can be safely ridden by an elderly rider by allowing him/her to make a turn by tilting the body of the bicycle in the same manner as riding an ordinary bicycle, and that can be kept upright while stopped, regardless of the condition of the road surface.

Means for Solving the Problem

In order to achieve the above object, the bicycle according to a first aspect of the invention includes: a frame extending longitudinally; a front wheel for steering at the front of the frame; a rear wheel at the rear of the frame; and an auxiliary means including first and second auxiliary support devices at one side and the other side, respectively, of the rear wheel, the first and second auxiliary support devices each including an auxiliary wheel for assisting movement of the bicycle, wherein each of the first and second auxiliary support devices includes: an arm whose one end is pivoted to the frame and whose free end moves vertically; the auxiliary wheel apart from and in parallel with the rear wheel, the auxiliary wheel being pivoted to the free end side of the arm; a biasing means for biasing the arm in the direction of lowering the auxiliary wheel; and an arm lock means for locking the rotation of the arm; the pair of arms rotate independently of each other; and the arm lock means restrict the rotation of the arms thereby locking the vertical movement of the auxiliary wheels.

According to a second aspect of the invention, each of the arm lock means includes: a movable constrained plate rotating integral with the arm; and a locking means for locking the movable constrained plate by triggering operation of the arm lock lever provided in the frame, and the arm lock lever is triggered to lock the rotation of the movable constrained plates simultaneously by operating the locking means of the first and second auxiliary support devices. According to a third aspect of the invention, each of the arm lock means includes: an immovable constrained plate fixed to the frame; and a locking means on the free end side of the arm, the locking means sandwiching the immovable constrained plate by triggering operation of the arm lock lever, and the arm lock lever is triggered to lock the rotation of the arms simultaneously by operating the locking means of the first and second auxiliary support devices.

According to a fourth aspect of the invention, the arm lock lever is attached to one end of a handlebar and a wheel brake lever is attached to the other end, the wheel brake lever operating wheel brake means for braking at least one of the front wheel and the rear wheel.

According to a fifth aspect of the invention, each of the biasing means includes a spring means having a spring attached to the frame, the spring pressing the arm downward; and the spring means includes an adjusting means for adjusting the pressing force of the spring.

According to a sixth aspect of the invention, in the auxiliary means, the ratio (H1/H2) of the amount of downward movement H2 to the amount of upward movement H1 of the auxiliary wheels from the bottom surface of the rear wheel when the rear wheel is upright is 1.2 to 4.0, and the ratio (H1/D) of the amount of upward movement H1 to the diameter D of the rear wheel is 0.05 to 0.3.

Effects of the Invention

In the first aspect of the invention, the auxiliary wheels disposed lateral to the rear wheel are pivoted to the free ends of the arms rotating while being downwardly biased by the biasing means. This allows the rider to lean to the right or the left by shifting his/her weight to the side. As a result, the rider can perform stable cornering with part of the load supported on the auxiliary wheels, thus traveling safely without being staggered. In addition, the auxiliary wheels can move vertically individually and run onto a projection such as pebbles on the road, allowing the rider to proceed without receiving a large impact. Furthermore, the arms of the auxiliary wheels disposed on both sides of the rear wheel rotate independently of each other, allowing the auxiliary wheels to individually perform the vertical movement. As a result, the rider can tilt the body of the bicycle by shifting his/her weight to the right or the left in the same manner as riding an ordinary bicycle not having auxiliary wheels.

When the bicycle is stopped, for example, at a red light, the arm lock means lock the vertical movement of the auxiliary wheels so as to fix the auxiliary wheels at desired heights even on a sloping road having a shoulder. As a result, the bicycle can be kept steadily upright without the rider having his/her feet on the roads preventing the rider from falling over even if hit by a strong cross wind. In addition, the auxiliary wheels can be moved vertically individually and be fixed at the individual heights as mentioned above. Therefore, when the road is uneven from one side of the rear wheel to the other, for example, when the road has a lateral slope or when one auxiliary wheel runs onto a stepped portion, the auxiliary wheels can be fixed at different heights from each other to keep the bicycle upright. Furthermore, a rider who does not have enough sense of balance can safely start moving the bicycle with the four wheels locked, and then can cancel the lock later. When riding over a road having a certain angle of lateral slope, the rider can lock the auxiliary wheels at the heights corresponding to the slope so as to move safely while keeping the body of the bicycle by the four wheels, that is, the front, rear, and auxiliary wheels.

The pair of arms can be restricted at the rotational positions independent of each other. This enables the auxiliary wheels on both sides of the rear wheel to come into contact with the road surface by fixing the auxiliary wheels at the individual heights corresponding to the road surface. This can be applied to the case of an undulating road surface besides a road with a uniform cross slope. As a result, the rider can safely stop the bicycle. In addition, the rear wheel disposed on the centerline as the main wheel supports the load on the rear portion of the bicycle stably. This prevents the body of the bicycle from largely bouncing due to the cushioning characteristics of the auxiliary wheels even on a rough road. Even if one auxiliary wheel falls into a ditch in the road, the rider can continue to move without being much influenced. Moreover, the rider can easily recognize the position of the rear wheel on the centerline, thereby easily steering the bicycle.

In this manner, the rider can ride the bicycle touching the ground with a total of four wheels of the front, rear, and auxiliary wheels which are disposed at both sides of the rear wheel and move vertically independently of each other. The rider can also stop the bicycle without touching the ground with his/her feet. These advantages improve the stability and safety of the bicycle. This invention can be applied to tandem bicycles or recumbent bicycles to overcome their disadvantages and improve their safety. On tandem bicycles, the riders can easily get off balance because they are designed to be ridden by two persons. Recumbent bicycles are unstable during low-speed running because the pedals are located high and near the front end.

In the second aspect of the invention, the movable constrained plates of the arms are simultaneously locked when the rider triggers the arm lock lever. This makes the auxiliary wheels easily fixed at appropriate heights with good operability as soon as the rider triggers the lever. Thus, the body of the bicycle can be kept in a stable posture by the rear and auxiliary wheels. In the third aspect of the invention, the locking means sandwiching the immovable constrained plate is provided on the free end side of the arm so as to obtain a force of constraint proportional to the length of the arm. This makes it possible to obtain stable braking performance and also to reduce the size of the immovable constrained plate and hence the size of the arm lock means.

In the fourth aspect of the invention, the arm lock lever and the wheel brake lever are attached to both ends of the handlebar. This allows the rider to grip these levers to lock the arms with good operability and timing. Furthermore, the rider can safely stop the bicycle by gripping both levers at the ends of the handlebar simultaneously, thereby fixing the auxiliary wheels at the heights corresponding to the road surface. As a result, the bicycle can be kept in a stable posture by being supported by the locked auxiliary wheels.

In the fifth aspect of the invention, the arms are biased by the spring means including the adjusting means for adjusting the pressing force. Therefore, when the rider is losing his/her sense of balance, the spring can be adjusted hard to make the auxiliary wheels more supportive, thereby preventing the rider from falling over. In contrast, when the rider has a good sense of balance, the support of the auxiliary wheels can be adjusted less hard for the rider to ride with the body of the bicycle tilted in the same manner as riding an ordinary bicycle. Furthermore, when the rider tends to incline on either side, the spring on the inclined side can be adjusted hard to reduce the inclination of the body of the bicycle, thereby allowing the rider to ride safely. When the road slopes down to the left such as a shoulder, the spring on the left side can be adjusted hard to compensate the slope.

When the amount of upward movement H1 of the auxiliary wheels is set as in the sixth aspect of the invention, the rider can make a turn by tilting the body of the bicycle, and the auxiliary wheels can be biased downward by a relatively compact mechanism.

REFERENCE MARKS IN THE DRAWINGS

Figure 1:
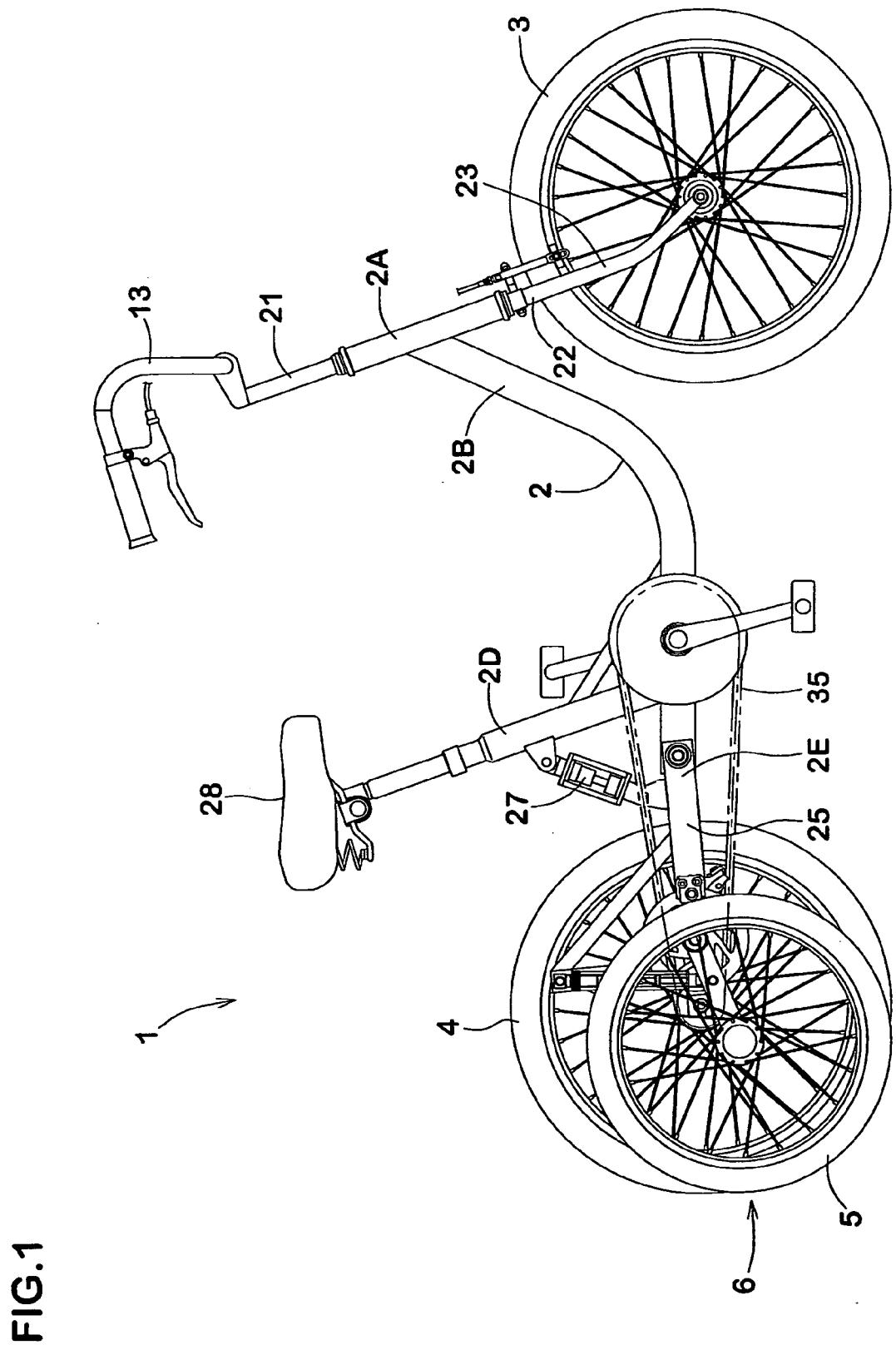
FIG. 1 is a front view of an embodiment of the present invention.

1 Bicycle
2 Frame
3 Front wheel
4 Rear wheel
5 Auxiliary wheel
6 Auxiliary means
7 Arm
8 Biasing means
9 Arm lock means
10 Movable constrained plate
11 Arm lock lever
12 Locking means
13 Handlebar
14 Wheel brake means
15 Wheel brake lever
16 Spring
17 Spring means
18 Adjusting means
19 Immovable constrained plate
S Auxiliary support device

BEST MODE FOR CARRYING OUT THE INVENTION

An embodiment of the present invention will be described as follows with reference to drawings. As shown in FIG. 1, a bicycle 1 includes a frame 2 extending longitudinally to form the body of the bicycle, a front wheel 3 and a rear wheel 4 disposed respectively at the front and rear of the frame 2, and an auxiliary means 6 for supporting the body of the bicycle to enhance safety. As shown in FIG. 1, the frame 2 of the present embodiment includes a head tube 2A, a down tube 2B extending backward from the head tube 2A, a seat tube 2D rising from the back of the down tube 2B so as to attach a height adjustable saddle 28 thereto, and a chain stay 2E extending backward from the rear end of the down tube 2B.

The head tube 2A has the bottom end of a handle stem 21 and the top end of a steering column 22 inserted thereinto so as to rotatably support these ends. The steering column 22 is connected to the handle stem 21. The head tube 2A forms a steering gear together with a handlebar 13 attached to the top end of the handle stem 21, a fork 23 extending under the steering column 22, and the front wheel 3 axially supported at the bottom end of the fork 23.

Figure 2:
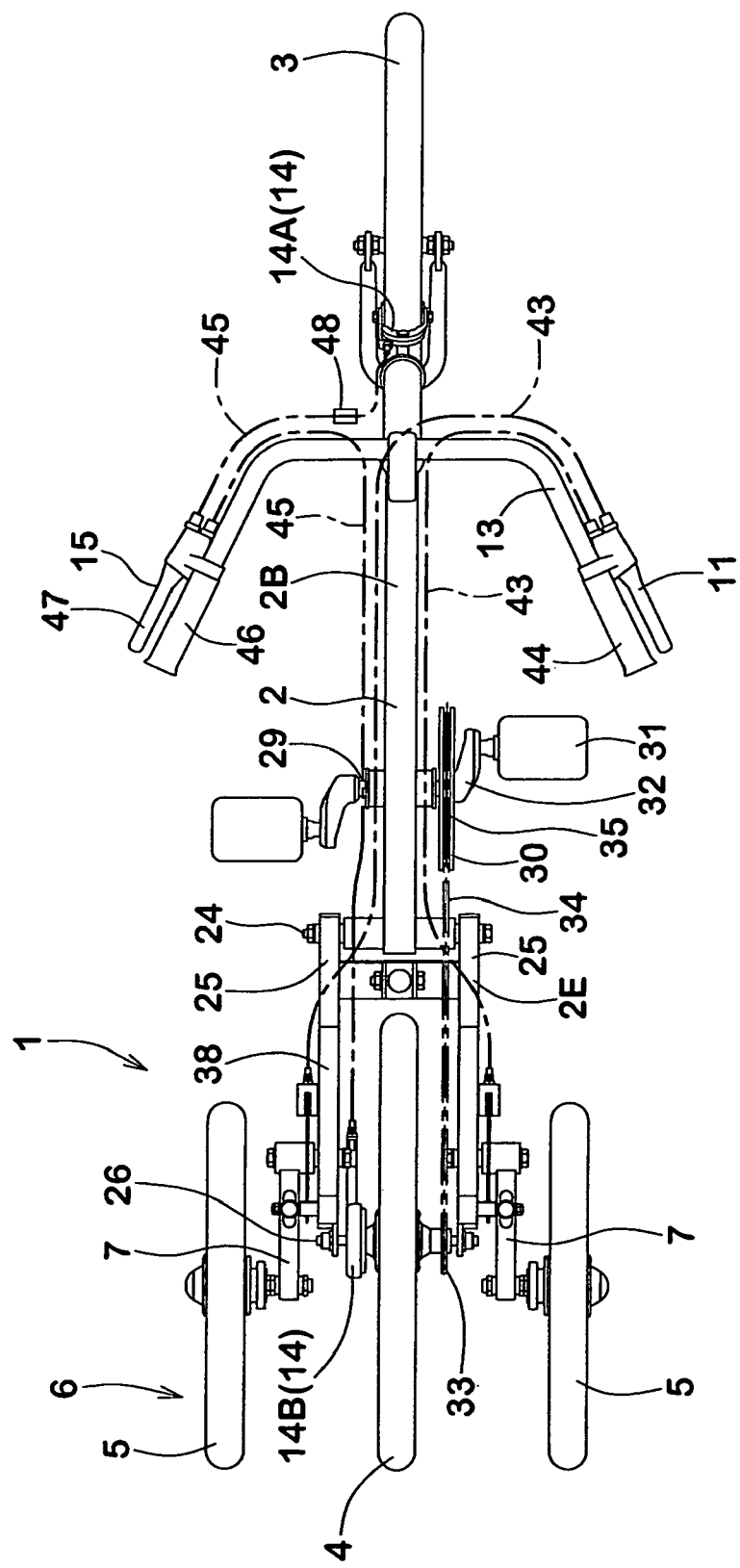
FIG. 2 is a plan view of the embodiment.
Figure 5:
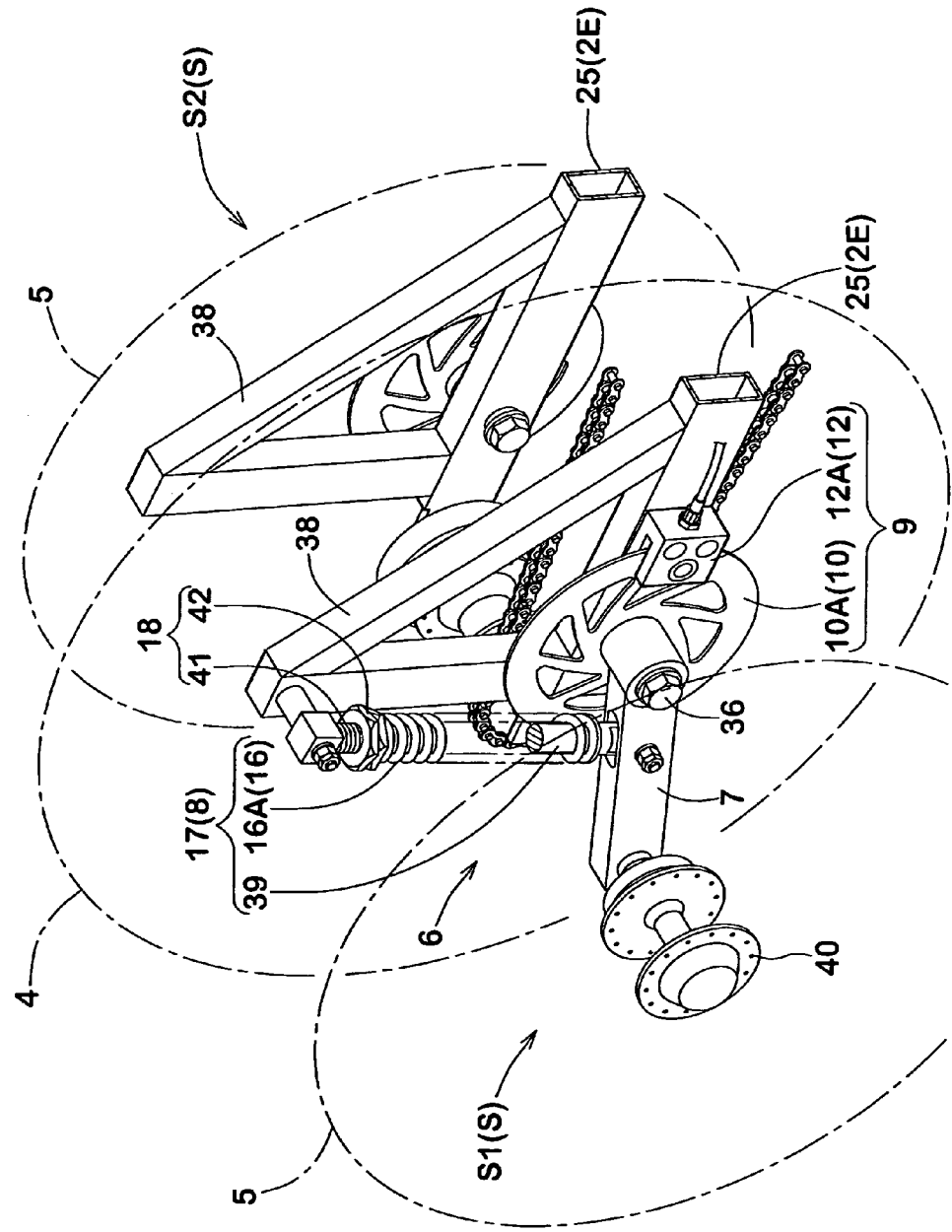
FIG. 5 is an enlarged perspective view of an essential part of the embodiment.

As shown in FIG. 2, the chain stay 2E of the present embodiment is composed of a pair of outer frames 25, 25 whose rear end sides can move vertically by being axially supported at both ends of a horizontal shaft 24. The horizontal shaft 24 is supported through the rear end of the down tube 2B. The rear ends of the outer frames 25, 25 are connected via a hub shaft 26 by which the rear wheel 4 is axially supported. As shown in FIG. 5, each outer frame 25 is provided at its rear end with a triangle frame 38 standing vertically. The chain stay 2E is connected to the seat tube 2D via a relatively hard suspension spring 27 extending therebetween to bias the rear wheel 4 downward.

As shown in FIG. 2, there is provided a driving gear 35 composed of a crankshaft 29, a chain ring 30, right and left cranks 32, a sprocket 33, and a chain 34. The crankshaft 29 is made immovable at the rear of the down tube 2B. The chain ring 30 is fixed to the crankshaft 29. The right and left cranks 32 rotate the chain ring 30 by pedals 31. The sprocket 33 is fixed to the hub shaft 26. The chain 34 extends between the sprocket 33 and the chain ring 30 so as to transmit the turning force of the chain ring 30 to the rear wheel 4. The force applied to the pedals 31 by the driving gear 35 is transmitted through the cranks 32, the chain ring 30, the chain 34, the sprocket 33, the hub shaft 26, and the rear wheel 4 in this order to reach the road surface, thereby moving the bicycle.

Figure 3:
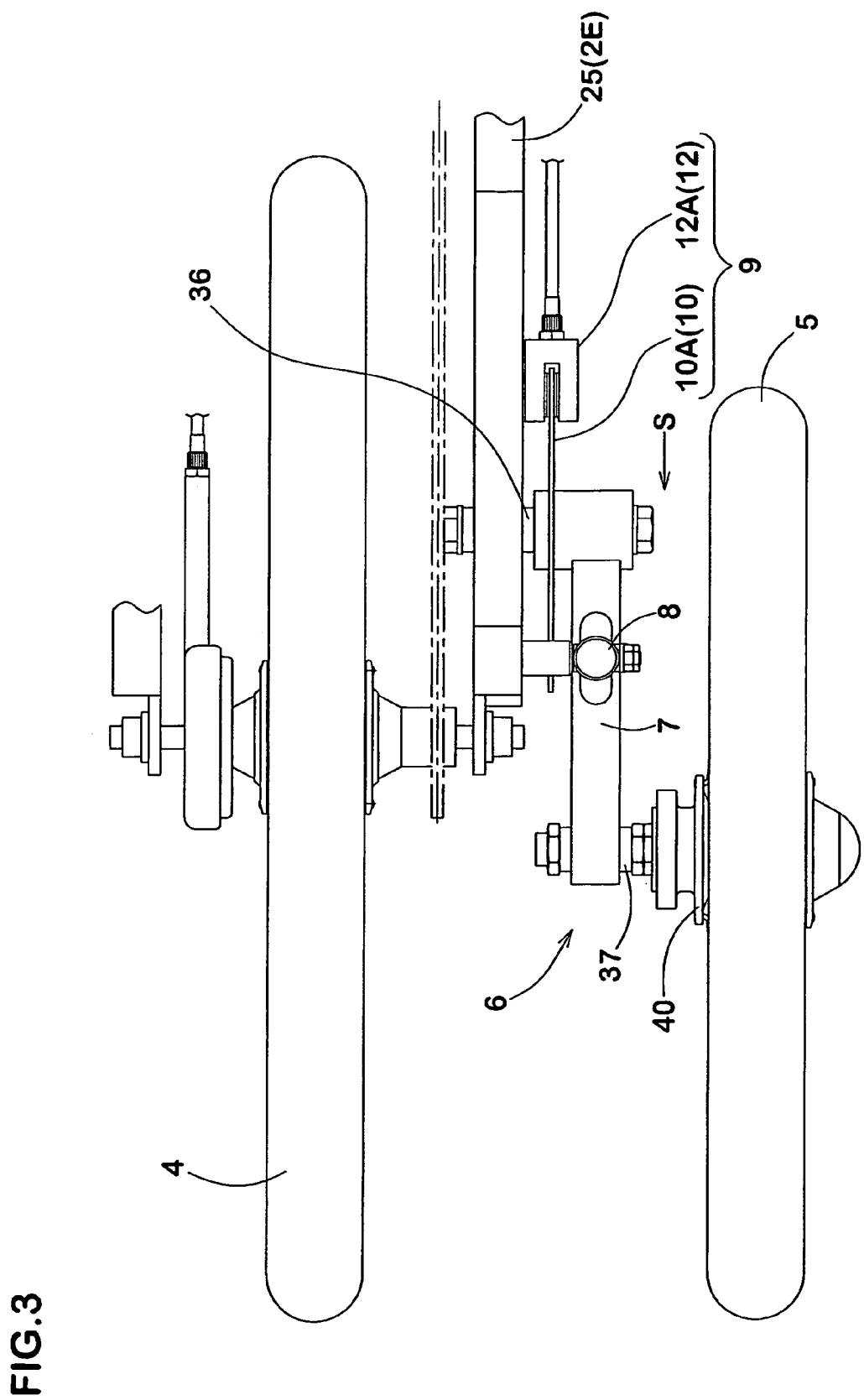
FIG. 3 is a partially enlarged view of the embodiment.

As shown in FIGS. 3 and 5, the auxiliary means 6 is composed of first and second auxiliary support devices S1 and S2 including auxiliary wheels 5. The auxiliary wheels 5 are disposed outside the outer frames 25, 25 so as to assist the moving of the bicycle at both sides of the rear wheel 4. Each auxiliary support device S includes an arm 7 pivoted to the outer frame 25, an auxiliary wheel 5 pivoted to the outside of the free end of the arm 7, a biasing means 8 for biasing the arm 7, and an arm lock means 9 for locking the rotation of the arm 7.

The arms 7 of the present embodiment are square bottle and their front ends are inserted into respective spindles 36. The spindles 36 protrude outwardly at a position to the rear of the outer frames 25 so that the free ends on the rear side can be supported to be vertically movable. The arms 7, 7 attached to the pair of the outer frames 25, 25 are not structurally linked to each other and rotate independently. At the free end of each arm 7 outwardly protrudes an auxiliary hub shaft 37.

Figure 6:
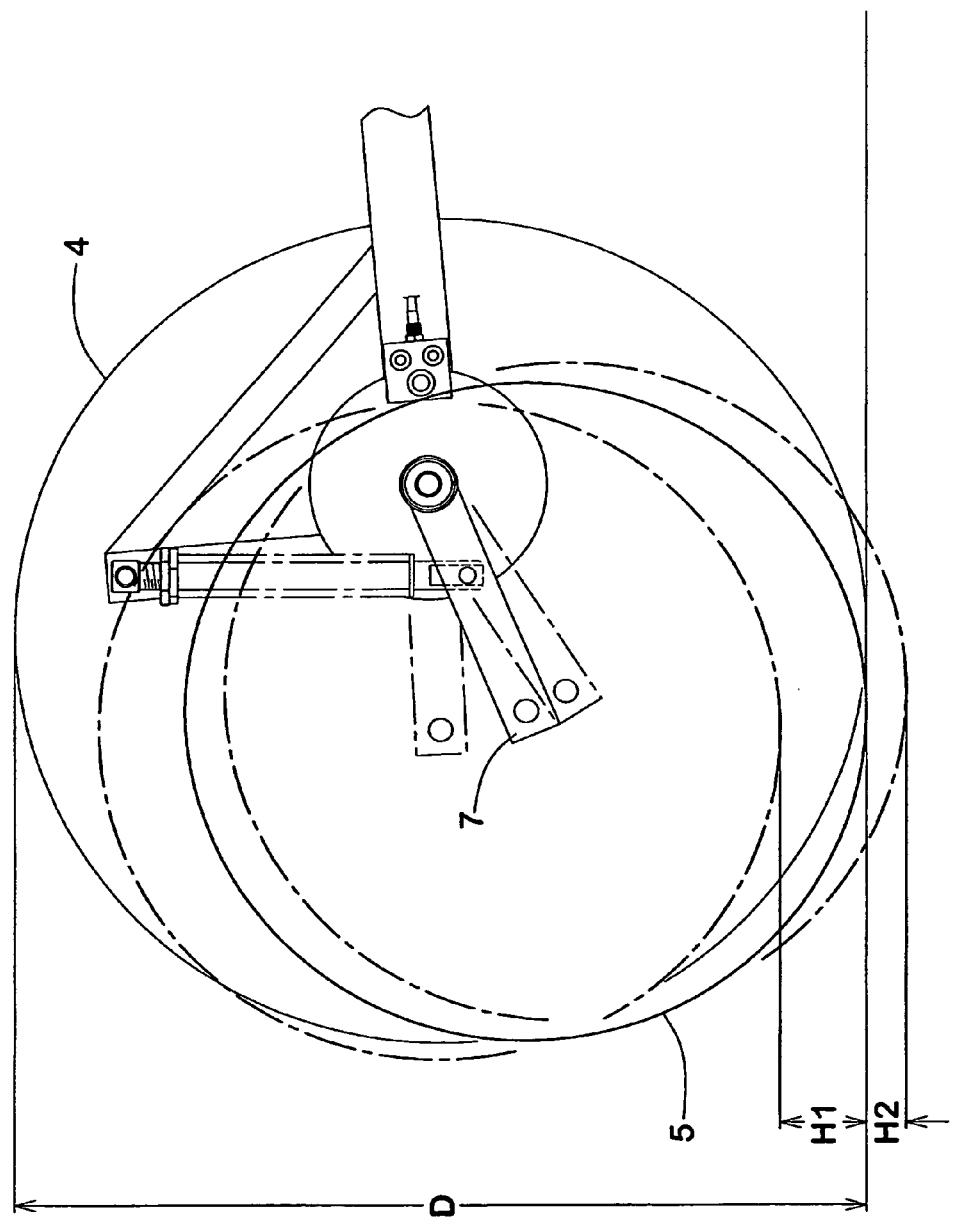
FIG. 6 is a diagram showing an operating condition of the embodiment.

As shown in FIG. 3, the auxiliary hub shaft 37 has a hub 40 of the auxiliary wheel 5 externally inserted around it via a bearing. This enables the auxiliary wheel 5 to be rotatably supported in parallel with the rear wheel 4 at the free end of the arm 7. As shown in FIG. 2, the center of the auxiliary wheels 5 of the present embodiment are arranged a little behind the center of the rear wheel 4 disposed therebetween, but may alternatively be arranged just beside the center of the rear wheel 4 or a little ahead of the center of the rear wheel 4 within the limits of not disturbing the pedals 31. As shown in FIG. 6, the pair of auxiliary wheels 5, 5 attached to the right and left arms 7, 7 can move vertically independently of each other at both sides of the rear wheel 4 in unison with the rotation of the arms 7.

Figure 4:
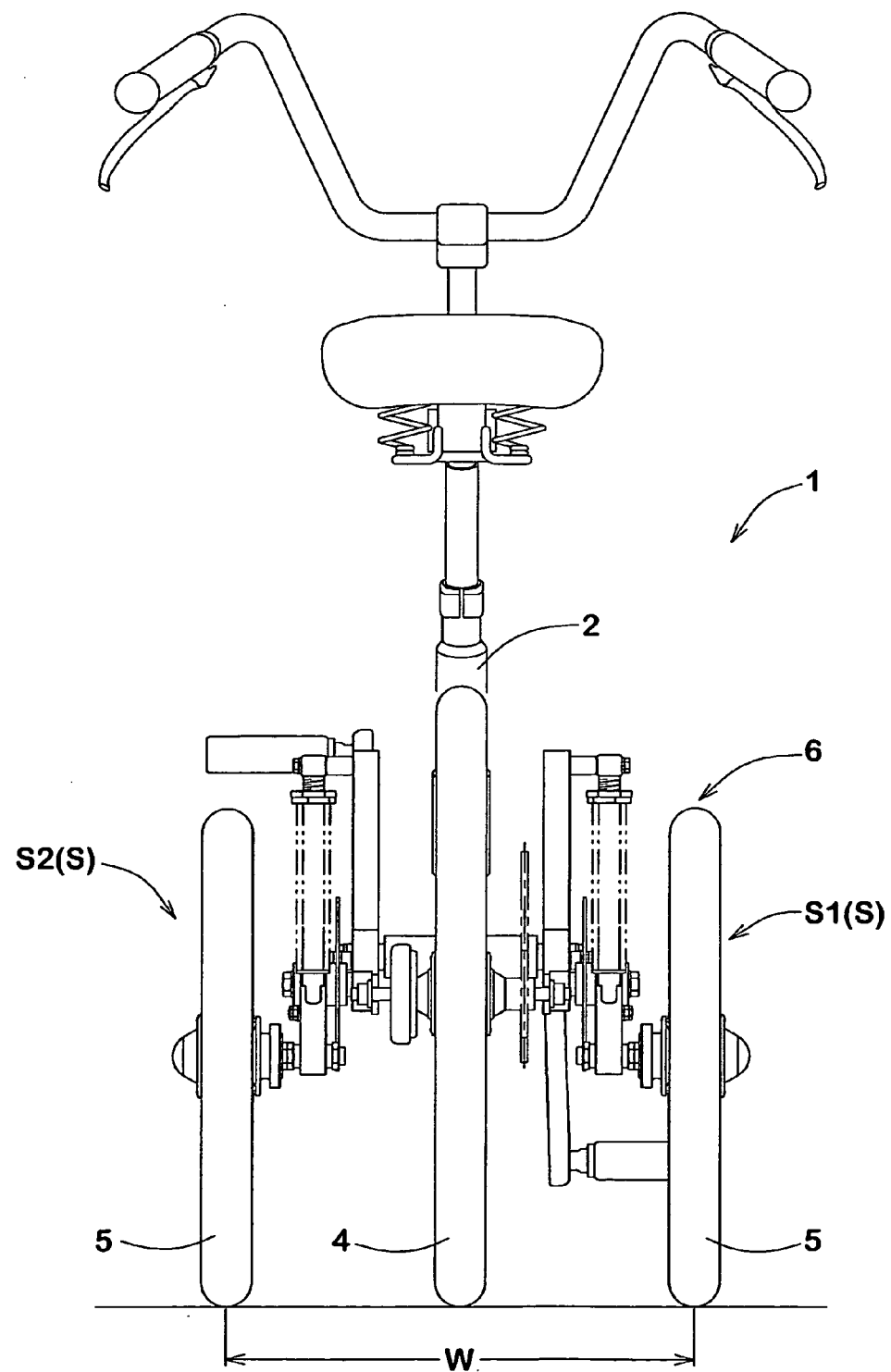
FIG. 4 is a side view of the embodiment.

The pair of auxiliary wheels 5 have a spacing "W" shown in FIG. 4 which can be 250 to 600 mm and is preferably 300 to 400 mm. In the present embodiment, the spacing is set to 380 mm. When the spacing is less than 250 mm, the force to support the tilted body of the bicycle is inefficient, and in addition, the components including the arms 7 and the driving gear 35 have to be arranged within a narrow space, possibly causing trouble. In contrast, when the spacing exceeds 400 mm, the auxiliary wheels 5 protrude beyond the ordinary pedals 31. This may cause the auxiliary wheels 5 to hit things on the road and hence the rider to fall over. When the spacing exceeds 600 mm, which is wider than the ordinary handlebar 13, the auxiliary wheels 5 are highly likely to hit a telephone pole or the like, causing the rider to fall over.

In order to make the body of the bicycle lighter-weight, the auxiliary wheels 5 are preferably smaller than the rear wheel 4 and can be 3 to 20 inches. The auxiliary wheels 5 of the present embodiment are formed of spoke wheels equipped with air rubber tires, but may alternatively be nylon wheels, urethane wheels, or the like equipped with solid rubber tires or urethane tires.

The biasing means 8 bias the arms 7 in the direction of lowering the auxiliary wheels 5, and in the present embodiment, are formed of spring means 17. As shown in FIG. 5, the spring means 17 includes a telescopic shaft 39 and a spring 16. The telescopic shaft 39 is expandable and contractable by an outer cylinder and a core slidably inserted into the outer cylinder. The telescopic shaft 39 is axially supported at its top and bottom ends between the top end of the triangle frame 38 of the outer frame 25 and the intermediate position of the arm 7. The spring 16 is formed of a coil spring 16A externally inserted around the telescopic shaft 39. The elastic force of the spring 16 presses the auxiliary wheel 5 at the end of the arm 7 downward.

Figure 7:
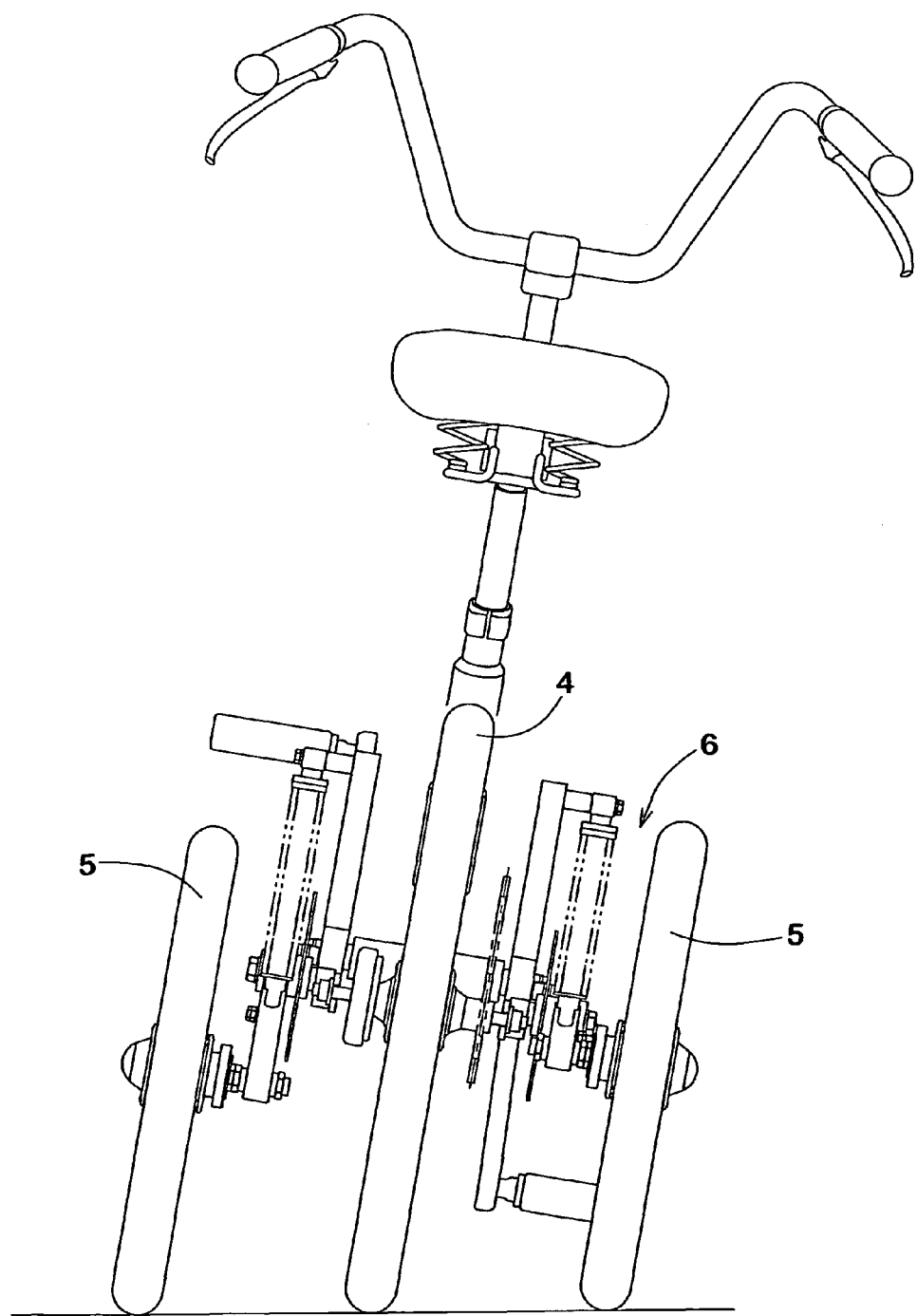
FIG. 7 is a side view showing the operating condition.
Figure 8:
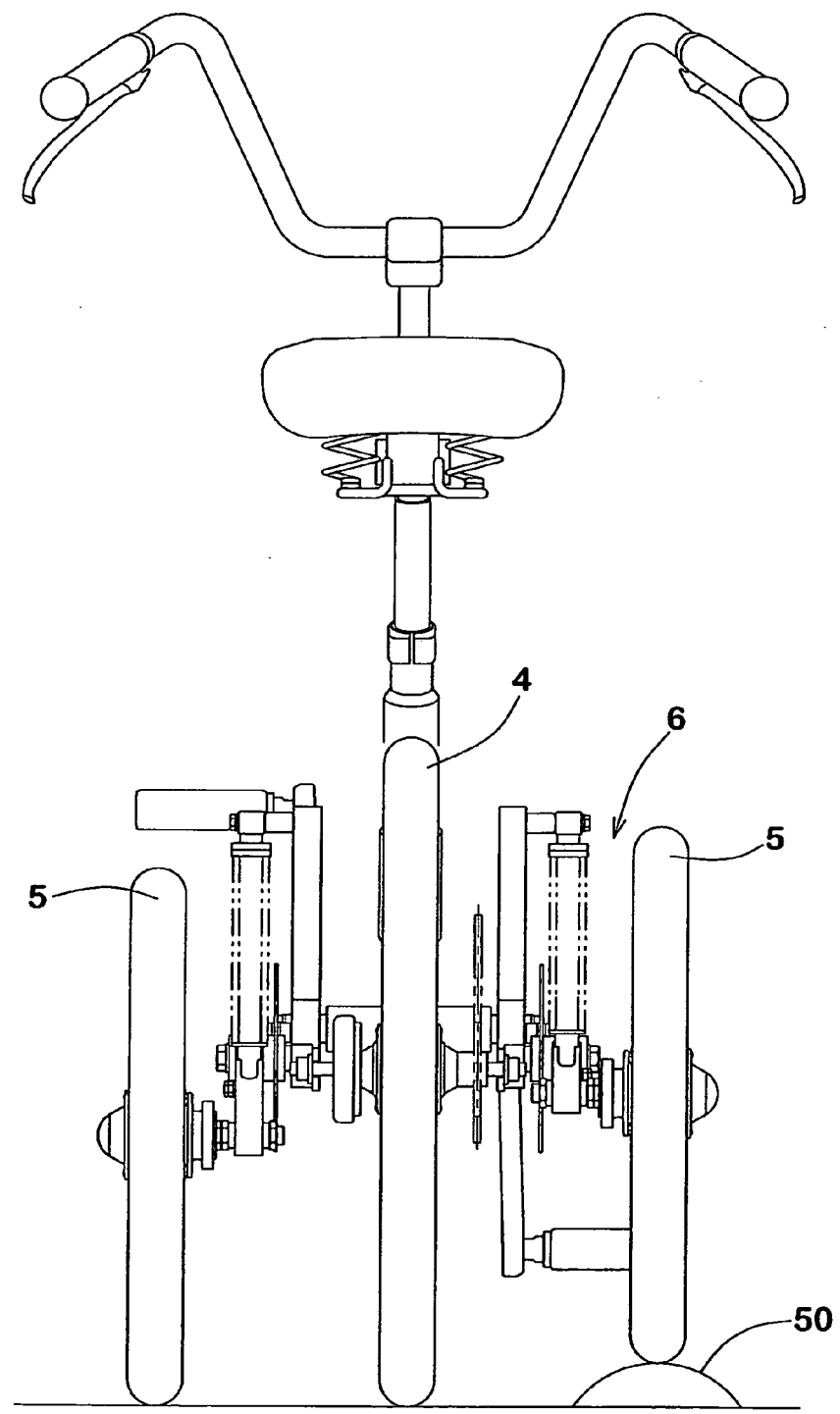
FIG. 8 is a side view showing another operating condition.

Thus, the auxiliary wheels 5 on both sides of the rear wheel 4 are pivoted to the ends of the arms 7 vertically moving while being pressed downward by the spring force. Therefore, when the rider shifts his/her weight to the right or the left, as shown in FIG. 7, the auxiliary wheel 5 on the inside of the curve opposes the spring force and is pressed up along the road surface, allowing the rider to lean his/her body. As a result, the rider can perform stable cornering without skidding, with part of the load supported on the auxiliary wheel 5 pressing the road surface by its spring force. In addition, as shown in FIG. 8, the auxiliary wheels 5 can move vertically individually and easily run onto a projection 50 such as pebbles on the road, allowing the rider to proceed without receiving a large impact.

In addition, the arms 7 equipped with the auxiliary wheels 5 rotate independently of each other on both sides of the rear wheel 4, so that the right and left auxiliary wheels 5, 5 can move vertically individually. Thus, the rider can tilt the body of the bicycle by shifting his/her weight in the same manner as riding an ordinary bicycle not having auxiliary wheels 5, thereby riding comfortably.

When the bicycle is moving, the rear wheel 4 disposed on the centerline as the main wheel supports the load on the rear portion of the bicycle stably by being supported by the auxiliary wheels 5 pressing the road surface by its spring force. This prevents the body of the bicycle from largely bouncing due to the cushioning characteristics of the auxiliary wheels 5 even on a rough road. Even if one auxiliary wheel 5 falls into a ditch in the road, the rider can continue to move without being much influenced. Moreover, the rider can easily sense the position of the rear wheel 4 on the centerline, thereby accurately performing the steering of the bicycle.

Although it also depends on the weight of the rider, the coil springs 16A have a spring constant which can be 5 to 30 N/mm, and is preferably 7 to 15 N/mm. In the present embodiment, the spring constant is set to 10 N/mm. When the spring constant is less than 5 N/mm, the force to press the auxiliary wheels 5 against the road surface is insufficient, causing the auxiliary wheels 5 received impact from a rough road surface to bounce. In contrast, when the spring constant exceeds 30 N/mm, the spring is too hard for the rider to lean to the right or the left, possibly causing the rider to be swung from side to side on a rough road surface.

As shown in FIG. 5, the spring means 17 of the present embodiment includes an adjusting means 18 consisting of a screw portion 41 and a double nut 42. The screw portion 41 has a screw groove on the top end of the telescopic shaft 39. The double nut 42 is threaded to the screw portion 41 so as to adjust the length of the coil spring 16A. The adjusting means 18 can increase or decrease the pressing force of the auxiliary wheel 5. For example, when the rider is losing his/her sense of balance, the coil spring 16A can be compressed to make the auxiliary wheels 5 more supportive, thereby preventing the rider from falling over. In contrast, when the rider has a good sense of balance, the coil spring 16A can be soft enough for the rider to enjoy slaloming by largely tilting the body of the bicycle in the same manner as riding an ordinary bicycle. Furthermore, when the rider tends to incline on either side, the coil spring 16A on the inclined side can be hardened to reduce the inclination of the body of the bicycle, thereby allowing the rider to ride safely. When the road slopes down to the left such as a shoulder, the coil spring 16A on the left side can be hardened to compensate the slope.

The rotation range of the arms 7 is determined by the length and other conditions of the coil springs 16A. The range of vertical movement of the auxiliary wheels 5 is determined by the rotation range and length of the arms 7. In the present embodiment, as shown in FIG. 6, the ratio (H1/H2) of the amount of downward movement H2 to the amount of upward movement H1 of the auxiliary wheels 5 from the bottom surface of the rear wheel 4 when the rear wheel 4 is upright can be 1.2 to 4.0, and is preferably 2.0 to 3.5. In the present embodiment, the ratio is set to 2.8 (H1 is 70 mm and H2 is 25 mm). When the ratio is less than 1.2, the amount of upward movement H1 is too small to obtain a necessary lean angle. In contrast, when the ratio exceeds 4.0, the upward movement exceeds the maximum lean angle. This requires very large coil springs 16A, thereby increasing the size and cost of the spring means 17.

In the present embodiment, the ratio (H1/D) of the amount of upward movement H1 to the diameter D of the rear wheel 4 can be 0.05 to 0.3, and is preferably 0.1 to 0.2. In the present embodiment, the ratio is set to 0.13. When the ratio is less than 0.05, the lean angle is not enough to perform cornering. In contrast, when it exceeds 0.3, the auxiliary wheels 5 have a very high elevation speed, requiring making the spring means 17 very large.

The biasing means 8 are formed of the coil springs 16A, but may alternatively be formed of metal springs such as torsion springs, spiral springs, laminated springs, or disc springs; fluid springs such as air springs or liquid springs; rubber springs; synthetic resin springs; or the like.

The arm lock means 9 of the present embodiment are formed on the arms 7, 7 and include movable constrained plates 10 and locking means 12 as shown in FIGS. 3 and 5. Each of the movable constrained plates 10 is formed of a disc rotor 10A rotating around the spindle 36 integrally with the arm 7. Each of the locking means 12 locks the rotation of the disc rotor 10A. The locking means 12 of the present embodiment is formed of a caliper 12A and includes a pad (unillustrated). The pad is attached to the outer surface of the outer frame 25 of the chain stay 2E so as to frictionally fix the disc rotor 10A by sandwiching and pressing it from both sides. These pads press the disc rotors 10A when the rider triggers an arm lock lever 11 engaged therewith via the wire 43 as shown in FIG. 2.

Therefore, when the bicycle is stopped, for example, at a red light, the arm lock lever 11 locks the disc rotors 10A to restrict the rotation of the arms 7, thereby fixing the auxiliary wheels 5 at those heights. This allows the bicycle to be kept steadily upright without the rider having his/her feet on the road, thereby preventing the rider from falling over even if hit by a strong cross wind. In addition, the auxiliary wheels 5 can be moved vertically individually and be fixed at the individual heights. Therefore, when the road is uneven from one side of the rear wheel 4 to the other, for example, when the road has a lateral slope such as a shoulder, when one auxiliary wheel 5 runs onto a stepped portion, or when the road is rough, the auxiliary wheels 5 fixed at the different heights can stably support the body of the bicycle.

Furthermore, even the elderly rider who is losing his/her sense of balance can safely start moving the bicycle with the four wheels locked, and later release the arm lock lever 11 to cancel the lock. When riding over a road having a certain angle of lateral slope, the rider can lock the auxiliary wheels 5 at the heights corresponding to the slope so as to move safely while keeping the body of the bicycle by the four wheels, that is, the front, rear, and auxiliary wheels. The rider can also safely stop the bicycle as follows. The rider can grasp the arm lock lever 11 softly enough to produce a frictional force which allows the wheels to rotate slowly while being braked by the disc rotors 10A. As a result, the auxiliary wheels 5 pressed by the road surface are gradually elevated to tilt the body of the bicycle slowly so that the rider can stop safely. The arm lock means 9 in the present embodiment are formed of the disc rotors 10A, but may be modified variously. For example, the movable constrained plates 10 may be disposed at a position to the free ends of the arms 7 and sandwiched between the halves of each caliper 12A so that the vertical movement of the arms 7 can be firmly locked by a relatively small force.

Figure 9:
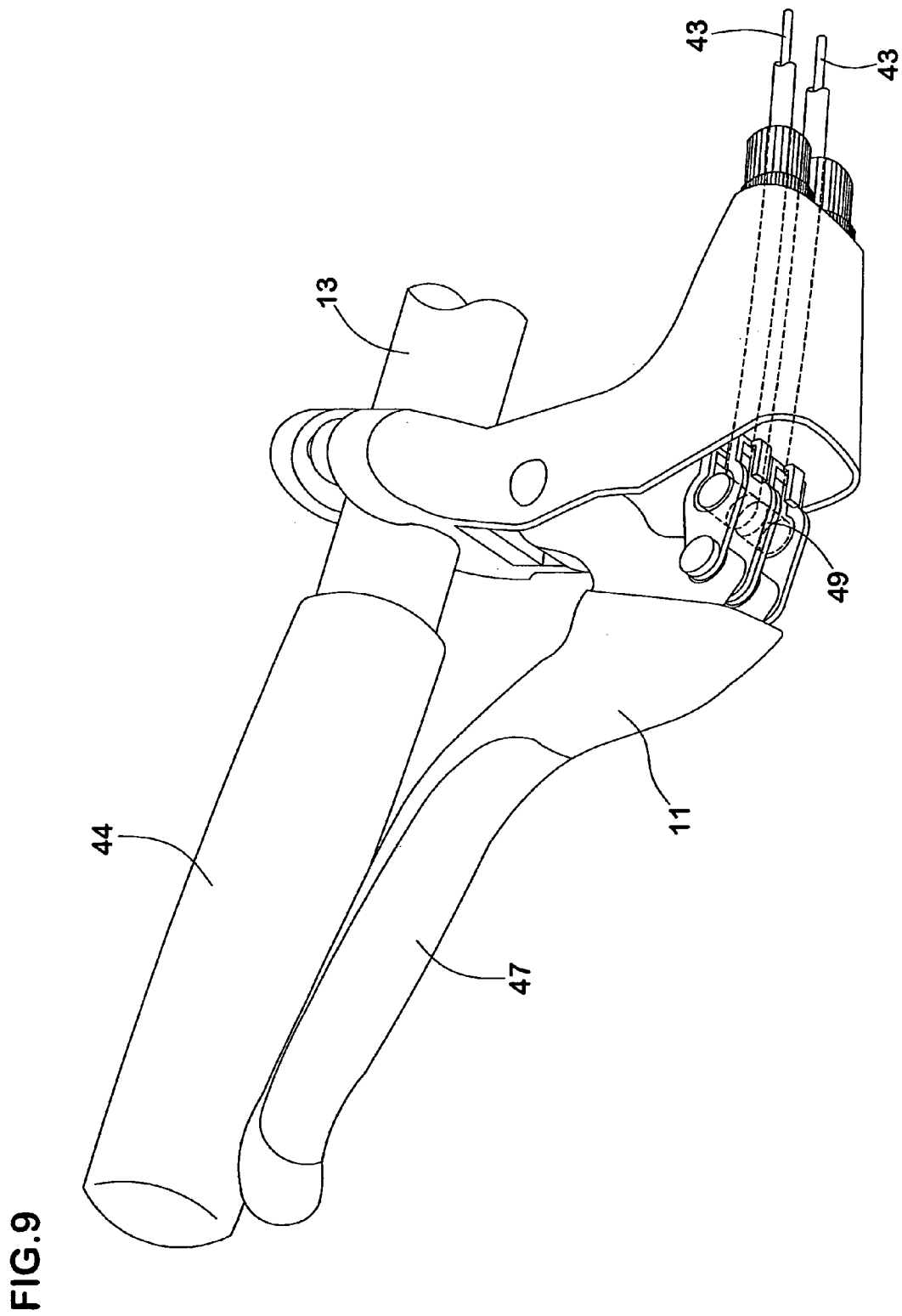
FIG. 9 is an enlarged perspective view of an arm lock lever.

As shown in FIG. 9, the arm lock lever 11 of the present embodiment is attached to a right grip 44 of the handlebar 13. The arm lock lever 11 includes a gripping portion 47 and a double engaging portion 49 at the end of the gripping portion 47. The engaging portion 49 is connected to the ends of two abutting wires 43, 43 extending toward the right and left locking means 12, 12. When the rider grips the gripping portion 47 with his/her right hand, the disc rotors 10A, 10A are locked to lock the vertical movement of the right and left auxiliary wheels 5, 5 simultaneously. As a result, the auxiliary wheels 5 can be easily fixed at appropriate heights as soon as the rider grips the gripping portion 47 with his/her right hand with good operability. This allows the rear wheel 4 and the auxiliary wheels 5 to hold the body of the bicycle in a stable posture.

As shown in FIG. 2, in the present embodiment, the handlebar 13 has a left grip 46 and a wheel brake lever 15 attached thereto. The wheel brake lever 15 is connected with the ends of the wires 45, 45 extending from a caliper brake 14A and a drum brake 14B, respectively. The caliper brake 14A brakes the front wheel 3 and the drum brake 14B brakes the rear wheel 4. The wheel brake lever 15 is formed of the same lever part as the arm lock lever 11 and includes a double engaging portion 49 for fixing the ends of the wires 45, 45 side by side. The rider can operate the front and rear wheel brake means 14 consisting of the caliper brake 14A and the drum brake 14B simultaneously by gripping the gripping portion 47. In the present embodiment, the wire 45 extending to the caliper brake 14A of the front wheel 3 is attached with a power modulator 48 for delaying the transmission of the operation of the brake lever. This makes the action of the drum brake 14B of the rear wheel 4 precede the action of the caliper brake 14A, thereby balancing the braking effect between the front and rear wheels.

Thus, in the present embodiment, the wheel brake lever 15 and the arm lock lever 11 are attached to the right and left grips 44, 46, respectively, of the handlebar 13, thereby facilitating the rider to use these levers properly. In order to safely stop the bicycle, the rider can grip both levers simultaneously, thereby fixing the auxiliary wheels 5 at the heights corresponding to the road surface. After being stopped, the bicycle can be kept in a stable posture by being supported by the locked auxiliary wheels 5. Therefore, even the rider who is not quick in action can easily respond to an unexpected event, thereby preventing from falling over and suffering injuries.

Figure 10:
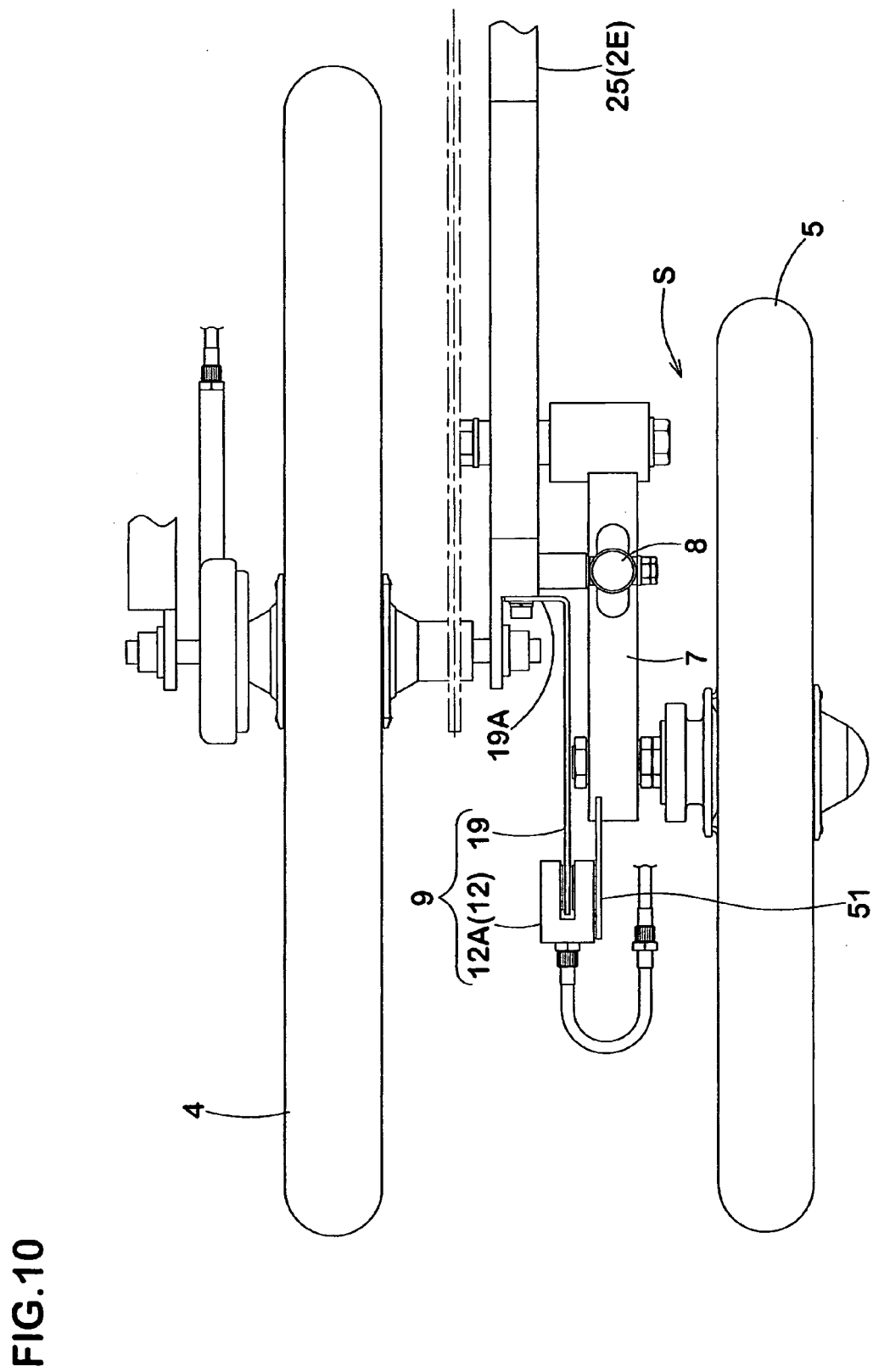
FIG. 10 is an enlarged plan view of an essential part of another embodiment.
Figure 11:
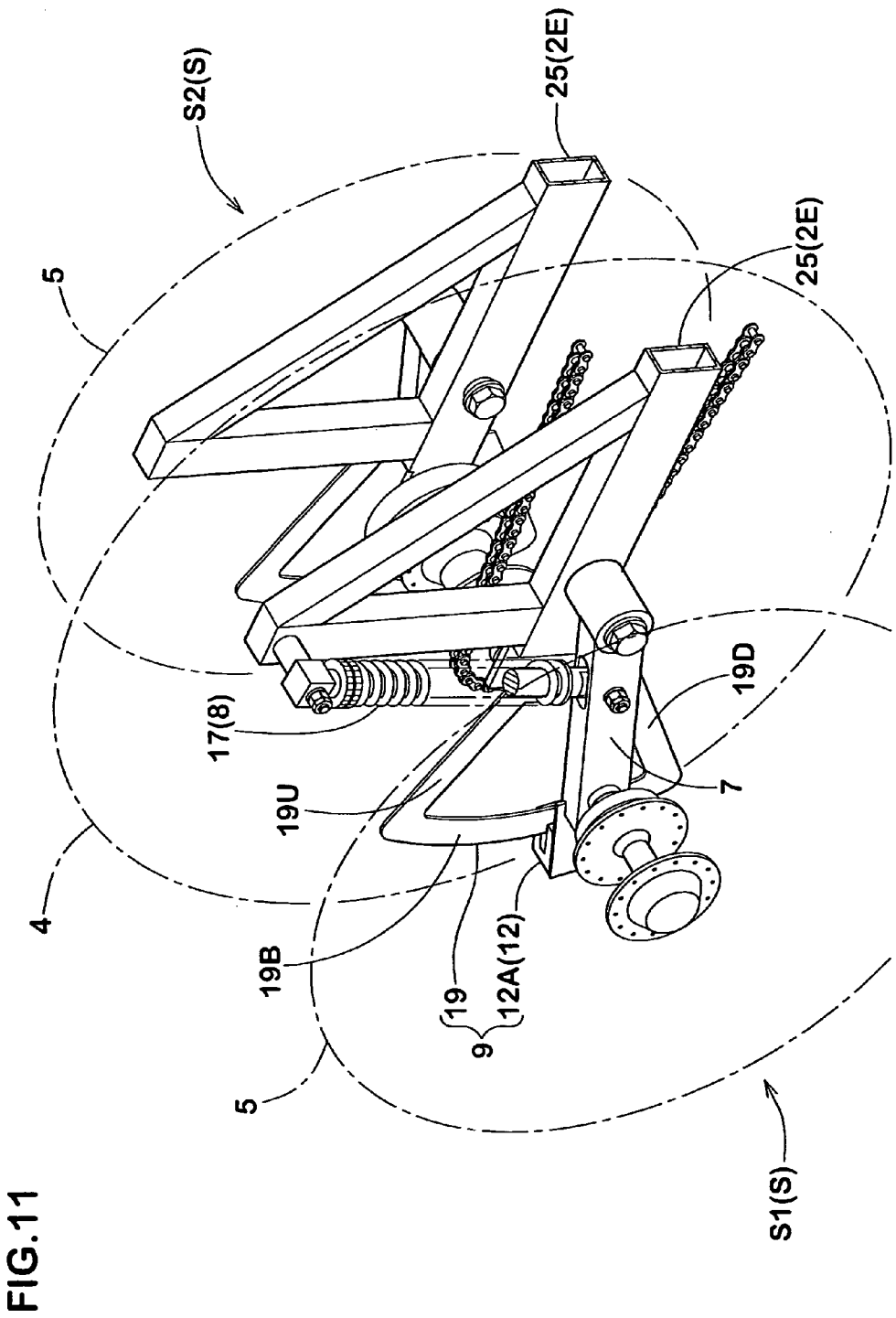
FIG. 11 is an enlarged perspective view of the essential part.

FIGS. 10 and 11 show another embodiment of the present invention. The following description is focused on the features different from the first embodiment and the main components shown in the drawings are labeled with the same reference numerals as those of the first embodiment. The arm lock means 9 of the present embodiment each include an immovable constrained plate 19 fixed to the rear end of the chain stay 2E of the frame 2 and a locking means 12 provided on the free end side of the arm 7. The immovable constrained plate 19 spreads out in a fan-like form around its front side. The immovable constrained plate 19 includes a fitting piece 19A, an arc portion 19B, and upper and lower inclined pieces 19U and 19D integrated to form a fan-shaped frame whose central portion is open for weight saving. The fitting piece 19A, which is disposed on the front side of the immovable constrained plate 19, is vertically long and has an L-shaped cross section. The arc portion 19B is disposed on the rear side of the immovable constrained plate 19 so as to face the fitting piece 19A. The upper and lower inclined pieces 19U and 19D connect the top and bottom ends of the arc portion 19B and the top and bottom ends of the fitting piece 19A, respectively. As shown in FIG. 10, the fitting piece 19A is bolted to the rear end surface of the chain stay 2E so that the immovable constrained plate 19 is formed behind the chain stay 2E.

Figure 12:
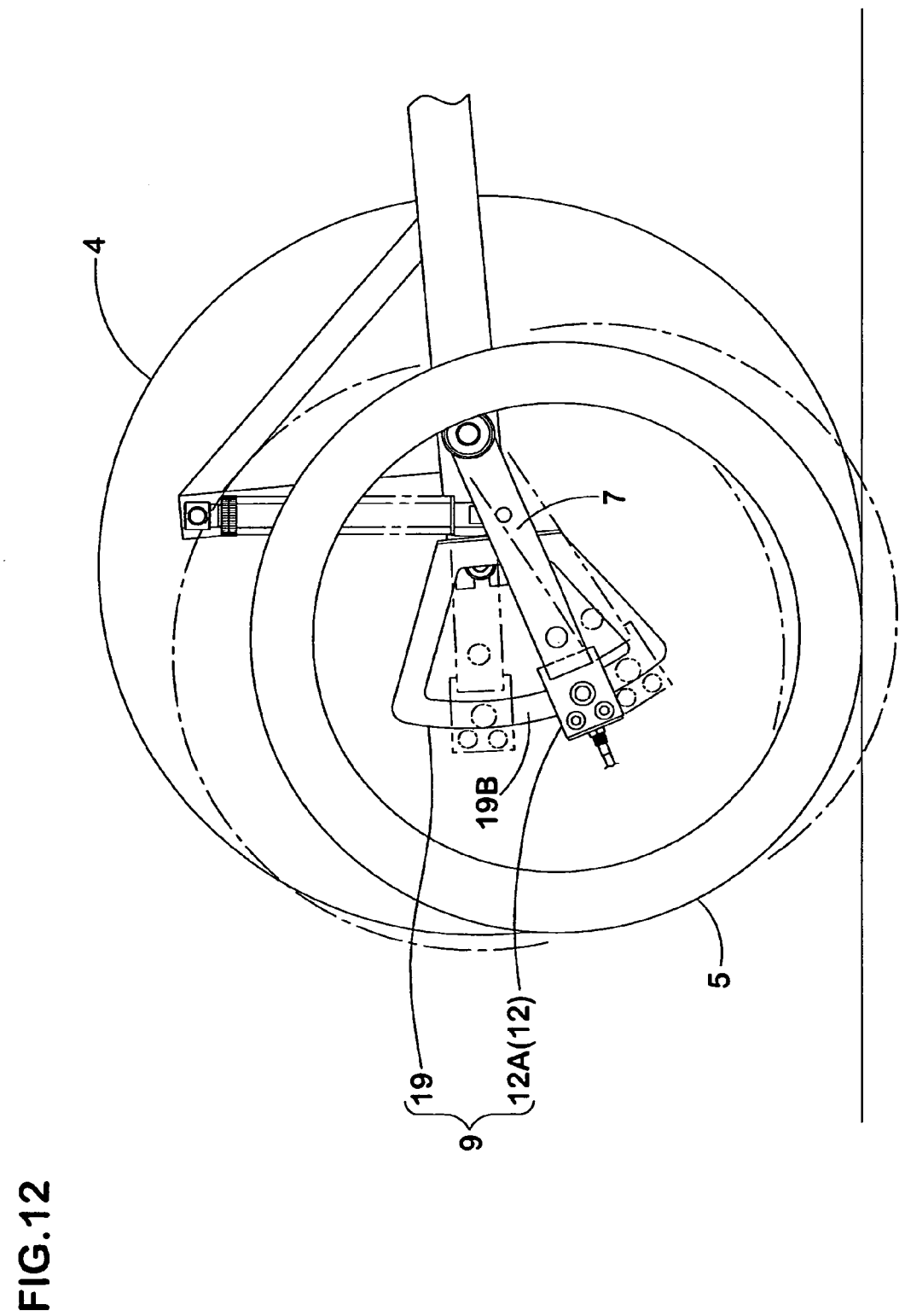
FIG. 12 is a diagram showing the operating condition of the essential part.
Figure 13:
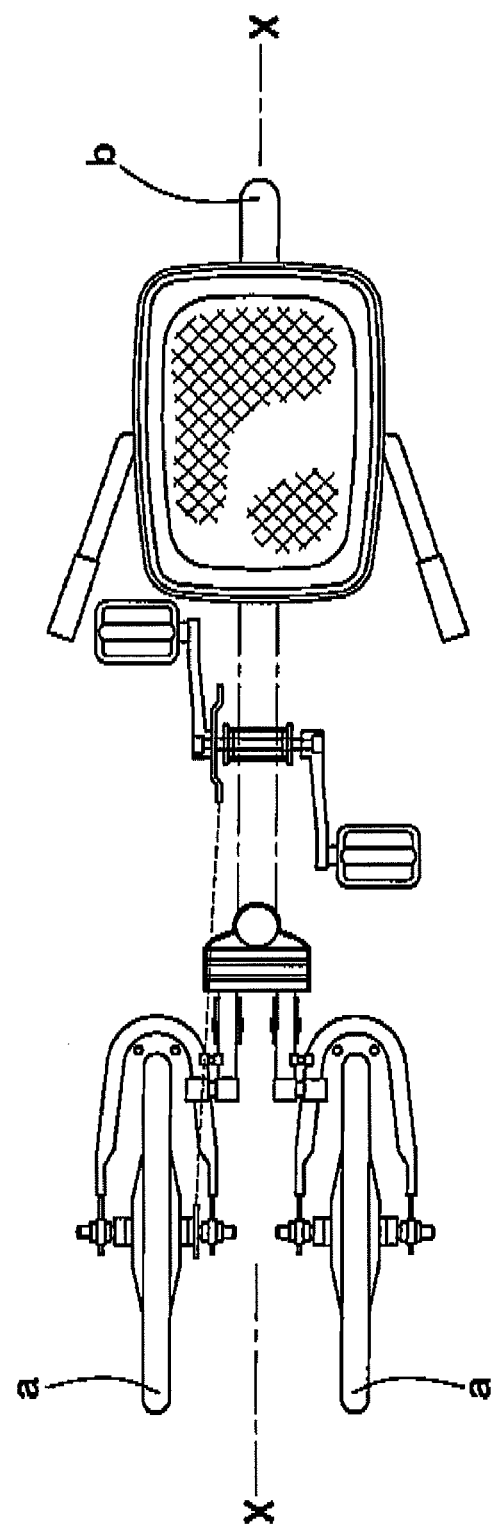
FIG. 13 is a plan view of a conventional example.
Figure 14:
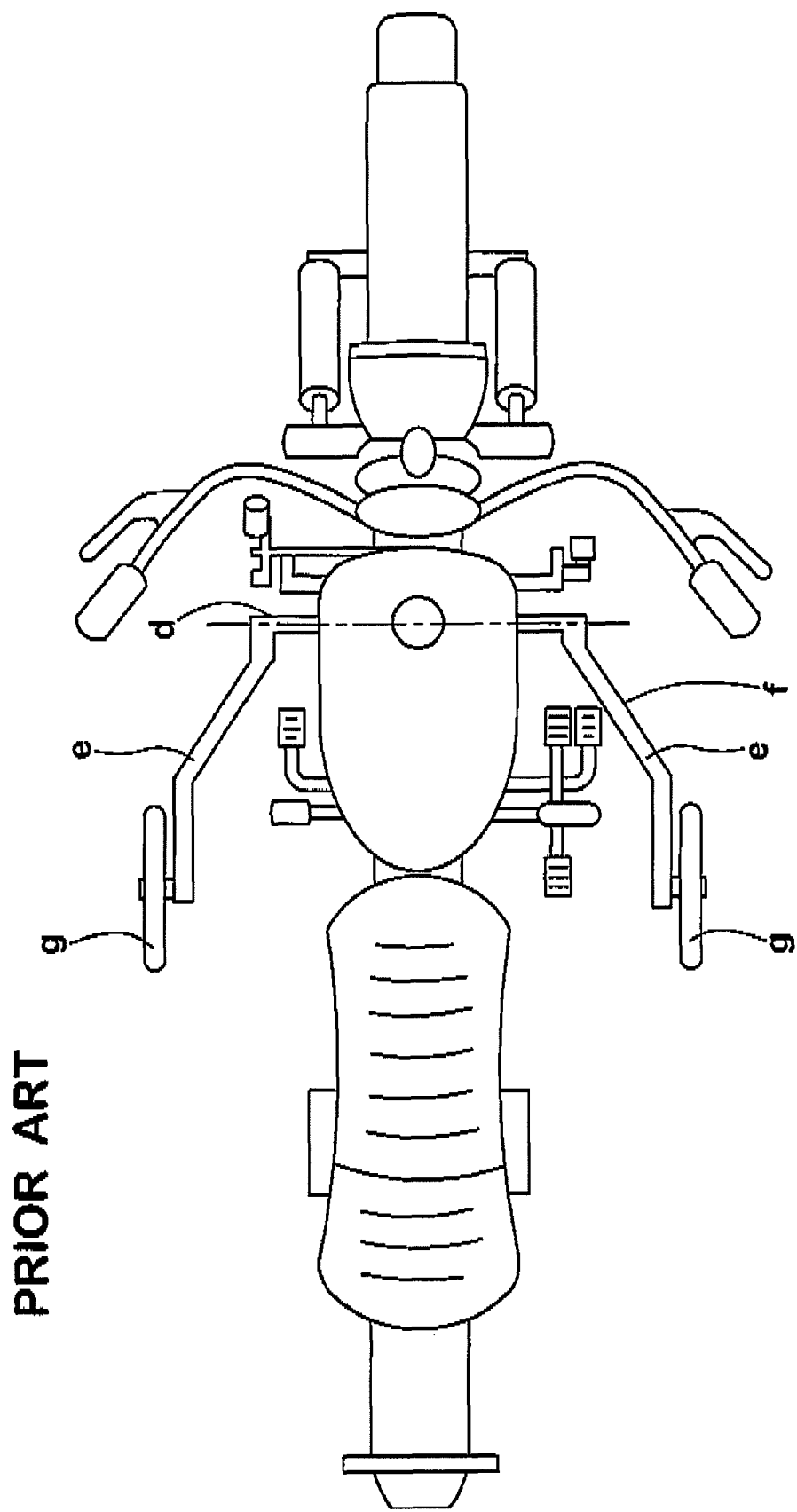
FIG. 14 is a plan view of another conventional example.

The locking means 12 is formed of the caliper 12A in the same manner as in the first embodiment. The caliper 12A is fixed to the inner surface of an upright attachment plate 51 expending backward and whose front end is buried in the free end of the arm 7. The caliper 12A is externally inserted around the arc portion 19B of the immovable constrained plate 19 and moves vertically along the arc portion 19B with the rotation of the arm 7 as shown in FIG. 12. In the same manner as in the first embodiment, when the rider triggers the arm lock lever 11 (unillustrated), the halves of the caliper 12A sandwich the arc portion 19B to move the right and left locking means 12, 12 simultaneously, thereby locking the rotation of the individual arms 7, 7. Thus, in the present embodiment, the locking means 12 provided on the free end side of the arm 7 sandwiches the immovable constrained plate 19 so as to lock the rotation of the arms 7. This produces a large force of constraint proportional to the length of the arm 7. As a result, it becomes possible to adapt stable braking performance to the vertical movement of the auxiliary wheels 5, and also to reduce the size of the immovable constrained plate 19 and hence the size of the arm lock means 9.

The aforementioned description just shows embodiments of the present invention. The technical scope of the present invention is not limited to these embodiments, but includes various modifications. For example, it is possible to use as an assembly part the auxiliary support device S including the auxiliary wheels 5, the arms 7 for supporting the auxiliary wheels 5, the spring means 17 for biasing the arms 7, the arm lock means 9, and the frames (the triangle frames 38). The assembly part can be designed to be bolted to an ordinary bicycle so as to be attached as optional equipment to all kinds of bicycles including mountain bikes. In addition, the assembly part can be conveniently utilized by being added to existing bicycles or detached therefrom depending on the situation. It is also possible to use an auxiliary support device S which can tilt the arm 7 upward against the spring force. The arm 7 extends laterally and is pivoted to the frame 2 around its inner end and axially supports the auxiliary wheels 5 by its external end. As the auxiliary wheels 5 go higher, the contact with the road surface is expanded outward. This can increase the stability when the bicycle is tilted.

The invention claimed is:

1. A bicycle comprising:
   a frame extending longitudinally;
   a front wheel for steering at a front of the frame;
   a rear wheel at a rear of the frame; and
   an auxiliary means disposed at the rear of the frame and including first and second auxiliary support devices at one side and the other side, respectively, of the rear wheel, the first and second auxiliary support devices each including an auxiliary wheel for assisting movement of the bicycle on each side of the rear wheel, wherein:
   each of the first and second auxiliary support devices includes:
      an arm having one end that is pivoted to the frame and having another end that moves vertically as a free end;
      the auxiliary wheel being pivoted to the free end side of the arm, and being apart from and in parallel with the rear wheel,
      a biasing means for biasing the arm in a direction of lowering the auxiliary wheel; and
      an arm lock means for locking the rotation of the arm;
   the pair of arms rotate independently of each other; and
   the arm lock means restrict the rotation of the arms thereby locking the vertical movement of the auxiliary wheels,
   wherein each of the biasing means includes a spring means having a spring attached to the frame, the spring pressing the arm downward, and
   the spring means includes an adjusting means for adjusting the pressing force of the spring.

2. The bicycle according to claim 1, wherein
   the auxiliary means includes an arm lock lever provided in the frame;
   each of the arm lock means includes:
      a movable constrained plate rotating integral with the arm; and
      a locking means for locking the movable constrained plate by triggering operation of the arm lock lever, and
   the arm lock lever is triggered to lock the rotation of the movable constrained plates simultaneously by operating the locking means of the first auxiliary support device and the locking means of the second auxiliary support device.

3. The bicycle according to claim 2, wherein
   the frame includes a handlebar having the arm lock lever at one end thereof and a wheel brake lever at the other end thereof, the wheel brake lever operating wheel brake means for braking at least one of the front wheel and the rear wheel.

4. The bicycle according to claim 1, wherein
   the auxiliary means includes an arm lock lever provided in the frame;
   each of the arm lock means includes:
      an immovable constrained plate fixed to the frame; and
      a locking means on the free end side of the arm, the locking means sandwiching the immovable constrained plate by triggering operation of the arm lock lever, and
   the arm lock lever is triggered to lock the rotation of the arms simultaneously by operating the locking means of the first auxiliary support device and the locking means of the second auxiliary support device.

5. The bicycle according to claim 4, wherein
   the frame includes a handlebar having the arm lock lever at one end thereof and a wheel brake lever at the other end thereof, the wheel brake lever operating wheel brake means for braking at least one of the front wheel and the rear wheel.

6. The bicycle according to claim 1, wherein
   in the auxiliary means, the ratio (H1/H2) of the amount of downward movement H2 to the amount of upward movement H1 of the auxiliary wheels from the bottom surface of the rear wheel when the rear wheel is upright is 1.2 to 4.0; and
   the ratio (H1/D) of the amount of upward movement H1 to a diameter D of the rear wheel is 0.05 to 0.3.

7. The bicycle according to claim 1, wherein the frame includes a chain stay comprising a pair of outer frames supported so that rear end sides thereof are movable vertically, and the rear wheel is supported by a hub shaft attached to the rear ends of the outer frames of the chain stay.

8. The bicycle according to claim 1, wherein the frame includes a chain stay comprising a pair of outer frames supported so that rear end sides thereof are movable vertically, the rear wheel is supported by a hub shaft attached to the rear ends of the outer frames of the chain stay, and the arms of the first and second auxiliary support devices are pivoted to the outer frames.

9. The bicycle according to claim 1, wherein the biasing means is disposed at an intermediate position of each of the arms of the first and second auxiliary support devices.

* * * * *

UNITED STATES PATENT AND TRADEMARK OFFICE
CERTIFICATE OF CORRECTION

| | | |
|---|---|---|
| PATENT NO. | : 7,798,512 B2 | |
| APPLICATION NO. | : 12/084109 | |
| DATED | : September 21, 2010 | |
| INVENTOR(S) | : Kinya Kanou | |

It is certified that error appears in the above-identified patent and that said Letters Patent is hereby corrected as shown below:

ON THE TITLE PAGE:

At item (30), correct the Foreign Application Priority Data to read as follows:

-- Oct. 28, 2005    (JP)    ............ 2005-314978
   Oct. 18, 2006    (JP)    ............ 2006-284228 --.

Signed and Sealed this
Third Day of May, 2011

David J. Kappos
*Director of the United States Patent and Trademark Office*